United States Patent [19]
Kearns

[11] Patent Number: 5,220,796
[45] Date of Patent: Jun. 22, 1993

[54] ADSORPTION CONDENSATION SOLVENT RECOVERY SYSTEM

[75] Inventor: Patrick Kearns, Oxford, N.J.

[73] Assignee: The BOC Group, Inc., Murray Hill, N.J.

[21] Appl. No.: 729,975

[22] Filed: Jul. 15, 1991

[51] Int. Cl.⁵ .................................................. F25J 3/00
[52] U.S. Cl. ........................................ 62/18; 55/74; 55/387
[58] Field of Search ............... 62/18, 12, 13; 55/74, 55/387

[56] References Cited

U.S. PATENT DOCUMENTS

| | | | |
|---|---|---|---|
| 3,327,489 | 6/1967 | Gaumer, Jr. | 62/18 |
| 3,371,496 | 3/1968 | Seidel | 62/18 |
| 3,501,921 | 3/1970 | Muenger et al. | 62/18 |
| 3,609,983 | 10/1971 | Lofredo et al. | 62/18 |
| 3,628,340 | 12/1971 | Meisler et al. | 62/18 |
| 3,827,245 | 8/1974 | Nygaard et al. | 62/18 |
| 3,854,914 | 12/1974 | Leyarovski et al. | 62/18 |
| 4,122,684 | 10/1978 | Clarkson et al. | |
| 4,188,793 | 2/1980 | Watson et al. | |
| 4,237,700 | 12/1980 | Rothchild | |
| 4,444,016 | 4/1984 | Banerjee | |
| 4,545,134 | 10/1985 | Mukerjee et al. | |
| 5,083,440 | 1/1992 | Karthaus et al. | 62/282 |

FOREIGN PATENT DOCUMENTS 9007165 10/1990 South Africa.
9007166 10/1990 South Africa.

Primary Examiner—Ronald C. Capossela
Attorney, Agent, or Firm—Coleman R. Reap; Larry R. Cassett

[57] ABSTRACT

A volatile component is recovered from an inert gas blanketed gas source containing the volatile component, an inert carrier gas, water vapor and oxygen as an impurity by a continuous process including the steps of adsorbing the water vapor from the stream, condensing substantially all of the volatile component from the stream, heating the water vapor-free and volatile component-free gas stream, purging the adsorbers with the heated gas stream and venting the purge gas and desorbed moisture. Inert gas depleted from the source is replenished with oxygen-free inert gas, thereby minimizing the concentration of oxygen in the source.

31 Claims, 2 Drawing Sheets

ADSORPTION CONDENSATION SOLVENT RECOVERY SYSTEM

BACKGROUND OF THE INVENTION

This invention relates to the recovery of high boiling gaseous compounds such as vaporized, normally liquid compounds, from gaseous mixtures, and more particularly to the recovery of vaporized solvents from solvent-inert carrier gas mixtures by condensing the solvent from the gas mixture.

Many technical and industrial processes result in the production of a product or by-product gas stream that contains a vaporized, normally liquid compound, i.e. a compound that is liquid at normal temperatures and pressures. For example, in the curing of organic solvent-borne resin coatings that have been deposited onto surfaces or articles, e.g. painted or lacquered metal parts for automobiles, home appliances and the like, it is common to bake the resin coating in an oven, thereby evaporating the solvent contained in the coating mixture and curing the solvent-free resin coating material. During the drying process the vaporized solvent is generally removed from the drying oven by a carrier gas that is inert with respect to the vaporized solvent under conditions that prevent or minimize the possibility of formation of an explosive or flammable gas mixture.

There is often a need to recover the high boiling gas component from the above-described gas mixtures. For instance, in some cases, the high boiling gas may have economic value that makes its recovery very desirable. In other cases, the high boiling gas may be hazardous or harmful to the environment and thus cannot be released to the atmosphere. Various methods have been employed for effecting the recovery of high boiling gas components from gas mixtures. Typical methods include condensation, adsorption and membrane separation. Condensation is often preferred because of its simplicity and efficiency.

Separation by condensation involves cooling the high boiling gas-laden gaseous stream to a temperature well below its dew point, thereby causing the high boiling gas to condense to the liquid state. The liquefied gas is then removed from the system. Processes for condensing high boiling gases from gas streams are disclosed in U.S. Pat. Nos. 4,122,684, 4,188,793, 4,237,700, 4,444,016, and 4,545,134.

Condensation works well for the recovery of high boiling gaseous compounds. Gas mixtures containing these compounds can be cooled to a temperature low enough to remove sufficient high boiling gas from the stream to enable the lean gas stream to meet the strict environmental standards set for gases discharged to the atmosphere without freezing the high boiling gas component on the surfaces of the condenser in which the gas mixture is cooled. However, when the gas stream contains contaminants which freeze at or above the temperature at which the heat exchange equipment must be operated, such as water vapor and/or carbon dioxide, it is difficult to successfully use a single condenser to condense the high boiling gas, since the condenser will eventually clog up with the frozen contaminant and have to be taken out of service until the frozen contaminant is removed from the condenser.

U.S. Pat. No. 4,188,793, issued to Watson et al. discloses the removal of impurities such as water and carbon dioxide from a gas mixture from which vinyl chloride is also to be separated by passing the incoming gas mixture through heat exchangers in which the impurities are frozen. Reversing heat exchangers can be employed in alternate service, so that while the contaminant is being frozen in one heat exchanger, the frozen contaminant is being thawed in the other heat exchanger. This patent also discloses removing vinyl chloride from the dried gas stream by condensation using liquefied nitrogen as the refrigerant. The nitrogen, which is vaporized and warmed during the condensation step is subsequently used to thaw the frozen impurities.

It is also known to pass the gas stream through adsorbers to remove moisture and other condensable contaminants from the gas stream prior to introducing the gas stream into a solvent condenser. The adsorbers are conventionally regenerated by passing a heated gas obtained from an external source, such as dry nitrogen or air, through the adsorbers. The solvent-depleted gaseous effluent from the condenser is usually recycled to the source of the gas stream for reuse as an inerting and carrier gas. When the gas stream contains a noncondensable impurity, such as oxygen or carbon monoxide, which enters the system as a result of leakage or chemical reaction, there is a likelihood of undesirable build-up of the impurity in the gas stream. Accordingly, it is not always practical to reuse the condenser effluent as a carrier gas, and fresh inert carrier gas must be used. This reduces the operating efficeincy of the recovery system.

There is a continuing search for improved systems for the recovery of high boiling gases from gas streams that additionally contain non-condensable gaseous impurities, the build-up of which cannot be tolerated in the system being treated. In particular, it is desirable to develop improvements to such systems that will enable them to operate more efficiently and effectively and at lower costs. The present invention provides improvements which produce these benefits.

SUMMARY OF THE INVENTION

According to one aspect of the invention, there is provided an improved process for recovering one or more condensable vapors from a gas source which contains a mixture comprising the condensable vapor(s), an inert carrier gas, one or more readily freezable gaseous impurities, such as water vapor and carbon dioxide, and one or more noncondensable gaseous impurities, by first removing the readily freezable impurities from the gas stream by temperature swing adsorption (TSA) and then cooling the readily freezable impurity-depleted gas stream in one or more steps to condense substantially all of the condensable vapor from the gas stream. The inert gas stream leaving the condenser, now comprised substantially of the inert carrier gas and the one or more noncondensable gaseous impurities, is used to purge the adsorbed readily freezable impurity from the adsorption zone. The impurity-containing inert gas leaving the system as purge gas is replaced by substantially pure inert gas, thereby maintaining a substantially constant pressure in the gas source. Liquefied condensable vapor is drawn from the condenser throughout the process.

In a preferred embodiment of the invention, the system is operated on a substantially continuous basis by operating two or more adsorbers out of phase with each other. In another preferred embodiment, the freezable impurities are removed from the gas stream being treated by two or more alternately operated TSA units using heated condenser effluent as the purge gas. In another preferred embodiment, gaseous condenser effluent in excess of the amount necessary for purging the adsorption zone is recycled to the vapor source for reuse as carrier gas. In a another preferred embodiment of the invention the vapor being condensed is directly or indirectly chilled by the evaporation of a liquefied cryogenic gas which is inert to the vapor and which is subsequently used as a supplemental purge gas and as an inerting and carrier gas for the vapor. In still another preferred embodiment, the gas stream entering the vapor condenser is compressed to a pressure of 2-25 psig, and more preferably to a pressure of about 5-15 psig.

In a specific embodiment of the invention, a gaseous solvent-borne resin coating drying oven effluent stream containing nitrogen as a carrier gas, solvent, and moisture and oxygen as contaminants is passed through a zeolite TSA adsorption bed, wherein moisture is adsorbed, and then through a vapor condenser, wherein substantially all of the solvent is condensed from the stream. The adsorption zone is comprised of a pair of TSA units operated 180 degrees out of phase such that one unit is in the adsorption mode while the other is in the regeneration mode. The gaseous effluent from the vapor condenser is heated and passed as a purge gas through the adsorber undergoing regeneration. The condenser is chilled by an intermediate coolant that, in turn is chilled by heat exchange with evaporating nitrogen. Sufficient evaporated nitrogen is conducted to the drying oven to replace the inerting and carrier gas that is removed from the system as purge gas.

BRIEF DESCRIPTION OF THE DRAWINGS

The invention will be more clearly understood by reference to the following description of exemplary embodiments thereof in conjunction with the accompanying drawings, in which.

DETAILED DESCRIPTION OF THE INVENTION

Figure 1:
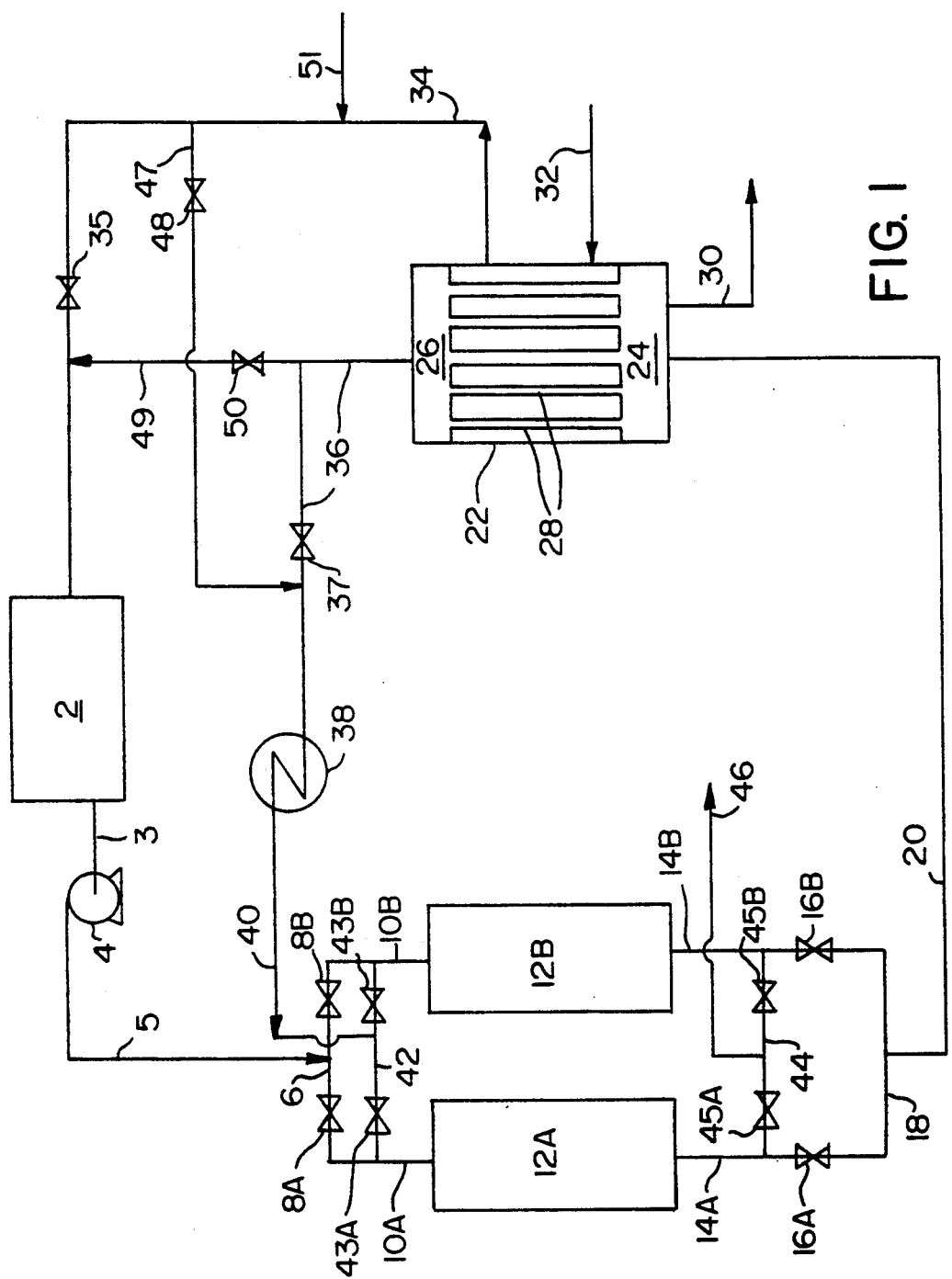
FIG. 1 is a diagrammatic view of one embodiment of a system for recovering one or more vaporized volatile components from a gas mixture.

The method of the invention can be used for the recovery of any vaporized volatile component from a gas mixture containing the vaporized volatile component, an inert carrier gas, one or more freezable gaseous components and one or more noncondensable gaseous impurities. The term "volatile component" is used in this description and the appended claims to denote a compound that is present in a gaseous mixture and which is to be removed from the mixture by the method of the invention. The volatile component may be any chemical compound or element having a boiling point higher than the boiling points of the components from which the vaporized volatile component is to be separated. The invention is particularly useful for the recovery of vapors of volatile liquids, i.e. liquids having boiling points above normal atmospheric temperatures, and easily condensable vapors, such as those that have boiling points above about $-100°$ C. The term "vaporized volatile component" is used herein to describe the gaseous state of the component being recovered and the term "liquefied volatile component" is used to describe the liquid state of the same component.

Organic volatile components which can be recovered by the process of the invention include hydrocarbons, such as alkanes, cycloalkanes, alkenes, aromatic compounds etc.; substituted alkanes and aromatic compounds, such as halogenated and sulfonated alkanes and aromatic compounds, etc. The invention is particularly useful for the recovery of solvent vapors that are released from inert gas-blanketed storage or reaction vessels or from solvent-borne resin coatings in drying ovens.

The term "freezable gaseous impurity" is used to describe a component in the gaseous state that has a freezing point above the freezing point of the volatile component(s) being recovered by the process of the invention. The most common freezable gaseous components are water vapor and carbon dioxide. The term "noncondensable gaseous impurity" is sometimes used herein to describe a gaseous compound that has a boiling point below the boiling point of the volatile components being recovered by the process of the invention and which is chemically reactive with the volatile component. Typical noncondensable gaseous impurities are oxygen and carbon monoxide.

The apparatus used in the preferred embodiment of the process of the invention comprises a plurality of temperature swing adsorption units adapted to be operated out of phase, such that in a given cycle moisture and other freezable gaseous impurities, such as carbon dioxide, contained in the gas stream are adsorbed in one adsorption unit while adsorbed freezable gaseous impurities are desorbed in another adsorption unit; one or more volatile component condensers; and a heating unit to heat the gas that is used to purge the adsorption units. The apparatus is operated in such a manner that the process gas mixture, i.e. the gas stream being treated in the solvent recovery system, is passed through one of the adsorption units, then through a compressor (if one is included in the system) and then through the volatile component condenser. Some or all of the gaseous effluent from the condenser then passes through a heat exchanger and then through another adsorption bed as a purge gas, while the remainder of the condenser effluent (if any) is recycled to the source of the process gas stream.

A unique feature of the invention is that some or all of the purified process gas stream itself is used to purge the impurities from the adsorption units of the system. This provides two benefits: it reduces the overall cost of the operation because it is unnecessary to dry and heat an externally provided gas for purging; and it prevents the build-up of undesirable noncondensable gaseous components in the system being treated. This is accomplished by replacing the oxygen-containing purge gas with fresh, substantially pure inert gas in an amount such that the pressure in the gas source will remain substantially constant.

Another feature of the invention is that the process gas stream entering the volatile component condenser may be compressed to a superatmospheric pressure. Compressing the process gas stream facilitates that condensation of vaporized volatile component(s) in the stream by causing the process gas to become saturated or supersaturarated with the vaporized volatile component(s) at a given temperature. When the gas stream is subsequently cooled, thereby lowering the dew point, vaporized volatile component condenses from the gas stream. Because of the increased pressure of the process gas stream, greater amounts of vaporized volatile component can be removed from the stream upon cooling of the gas.

Figure 2:
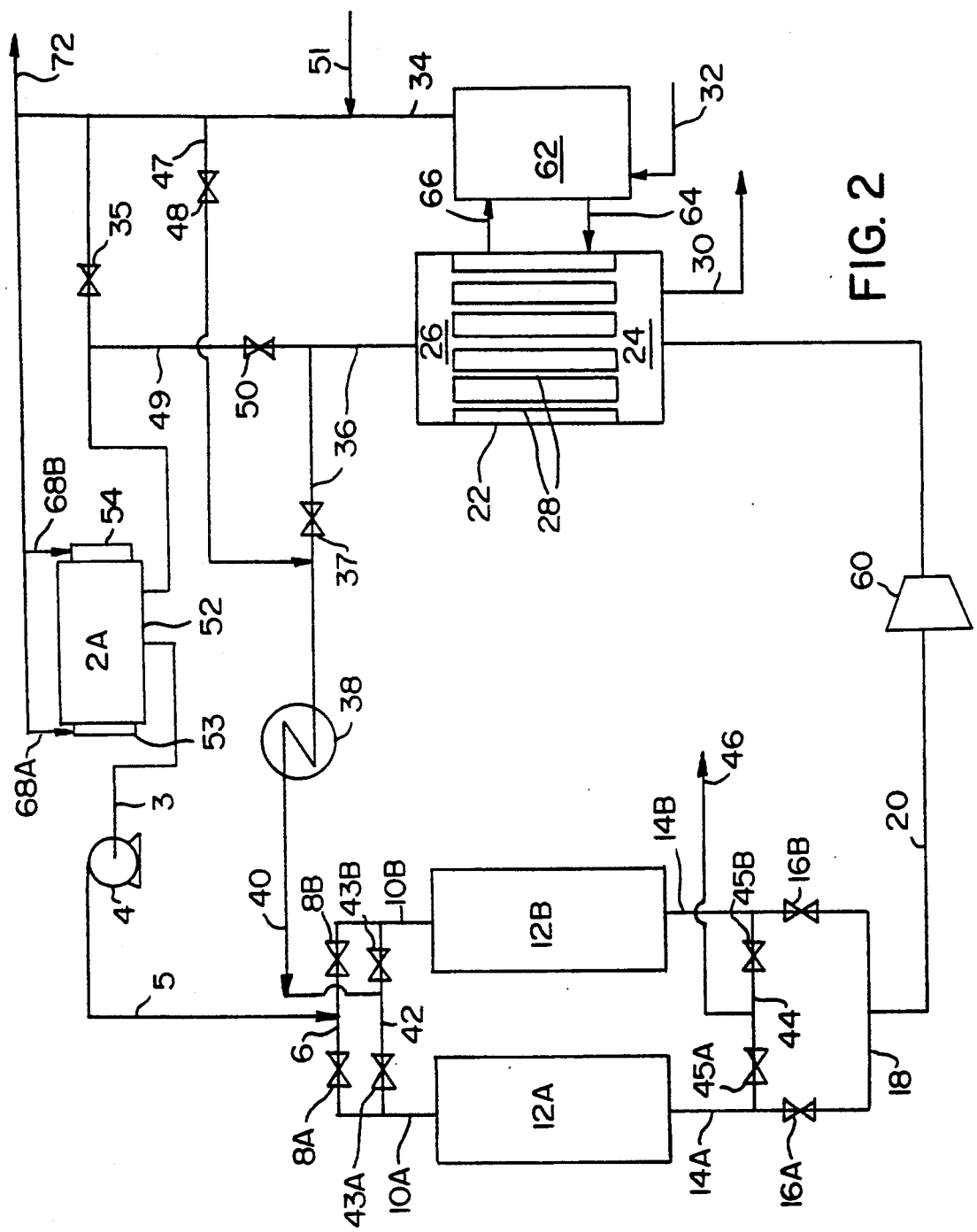
FIG. 2 is a diagrammatic view of a system for recovering a vaporized solvent from a resin coating drying chamber The same reference numerals are used to represent the same pieces of equipment in the various drawing figures. Only equipment, valves and lines necessary for an understanding of the invention have been included in the drawing figures.

The refrigerant used to chill the vaporized volatile component in the condenser of systems used in the process of the invention may be any refrigerant that can provide the chilling necessary to condense the volatile component. Chilling may be provided by the direct use of a low boiling liquefied inert gas, as illustrated in FIG. 1, or by means of an intermediate refrigeration system, as illustrated in FIG. 2. When chilling is provided directly by means of a liquefied gas, it is preferred to use a compound that is compatible with the environment and which can be discharged to the atmosphere after use, if desired. Inert cryogenic liquids, such as liquefied nitrogen and liquefied argon are particularly preferred since they can be discharged to the atmosphere or used for other purposes after being discharged from the system. Nitrogen is particularly preferred because of its ready availability and low cost. When a liquefied gas is directly used as the refrigerant, it is usually vaporized during its passage through the exchangers. The vaporized refrigerant is usually still very cold; accordingly, it may be desirable to use this stream for other cooling applications and then return the stream to the gas source being treated as make-up carrier gas, or it may be used to purge the adsorption units of the system and subsequently released to the atmosphere.

Turning now to FIG. 1 of the drawings, illustrated therein is a system for recovering a vaporized volatile component from the above-described process gas stream. In the illustrated system, gas source 2 provides the process gas stream treated in the process of the invention. Gas source 2 may be an inert gas-blanketed gas storage vessel, a chemical process unit or a solvent-borne resin coating drying unit, or any other unit or system which contains, or in which is generated, a mixture of an inert gas and a volatile gaseous component. Line 3 connects gas source 2 to the inlet to blower 4, which may be any suitable gas blowing device. Blower discharge line 5 is connected to manifold 6, which, in turn, is connected to adsorption units 12A and 12B via inlet lines 10A and 10B, respectively. Flow through lines 12A and 12B is controlled by valves 8A and 8B, respectively.

Adsorption units 12A and 12B are temperature swing adsorption units and are packed with any adsorbent suitable for use in adsorbing freezable components, such as water and carbon dioxide. Typical adsorbents include alumina, silica gel, molecular sieves such as zeolites, i.e. crystalline aluminosilicates. The preferred adsorbents for adsorption of moisture are crystalline aluminosilicates, alumina and silica gel. The most preferred adsorbent is crystalline aluminosilicates, such as Davison 3A molecular sieves, sold by W. R. Grace Company. The outlet ends of adsorption units 12A and 12B are joined to manifold 18 via adsorber outlet lines 14A and 14B, respectively Flow through lines 14A and 14B is controlled by valves 16A and 16B, respectively. Line 20 connects manifold 18 with inlet header 24 of condenser 22. Condenser 22 may be any device that provides heat exchange between a gas and a fluid refrigerant. Preferred condensers are those having finned tube or single or multiple pass shell and tube construction. Condenser 22 is illustrated for exemplary purposes as a vertically disposed, single pass shell and tube exchanger with the process gas inlet and liquefied volatile component drain line at the bottom and the process gas outlet at the top. Condenser 22 is provided with an inlet header 24 and an outlet header 26. Tubes 28 provide fluid communication between inlet header 24 and outlet header 26. Drainage of liquefied volatile component from condenser 22 to volatile component recovery is provided by line 30. The shell side of condenser 22 communicates with both liquefied inert gas inlet line 32 and inert gas outlet line 34. On its other end, line 34, controlled by valve 35, connects to gas source 2.

Outlet header 26 of condenser 22 is connected to purge line 36, flow through which is controlled by valve 37. Line 36, in turn, is connected to the inlet end of purge gas heater 38. Purge gas heater 38 may be any heating device suitable for heating the purge gas in line 36 to the temperature necessary for efficient purging of adsorption units 12A and 12B. Suitable heating devices include liquid heat exchangers and indirectly fired heaters or electric heaters. The outlet end of heater 38 is connected to line 40, which is connected to purge gas manifold 42. Fluid flow from manifold 42 to adsorber inlet lines 10A and 10B is controlled by valves 43A and 43B, respectively. On the outlet end of adsorption units 12A and 12B flow between adsorber outlet lines 14A and 14B and manifold 44 is controlled by valves 45A and 45B, respectively. Finally, manifold 44 communicates with vent 46, which may be open to the atmosphere or to other gas disposal means.

Inert gas outlet line 34 also communicates through line 47 with purge gas line 36 between valve 37 and purge gas heater 38. Flow through line 47 is controlled by valve 48. Similarly, line 36 communicates with line 34 between valve 35 and gas source 2 via line 49, flow through which is controlled by valve 50. Line 34 is also connected to a source of inert gas through inert gas make-up line 51.

The process of the invention, as practiced in the apparatus of FIG. 1, will be described starting with the phase in which adsorption unit 12A is in the adsorption mode, i.e. it receives process gas from gas source 2, and adsorption unit 12B is in the regeneration mode, that is, it is being purged by heated gas flowing through line 40 from the discharge end of condenser 22. During this step of the process, valves 8A, 16A, 35, 37, 43B and 45B are open and all other valves are closed. The process gas stream leaving gas source 2 via line 4 is propelled through the system by blower 4. The process gas passes through line 5, manifold 6, valve 8A and line 10A, and enters adsorption unit 12A. The process gas stream entering adsorption units 12A and 12B is usually at temperatures in the range of about 2° to 70° C. and more commonly 5° to 40° C. In adsorption unit 12A moisture and carbon dioxide (if present) are adsorbed from the gas stream. The substantially dry and carbon dioxide-depleted process gas stream then leaves adsorption unit 12A through line 14A, flows through valve 16A, manifold 18 and line 20 and enters condenser 22 via inlet header 24. The gas stream then flows upwardly through tubes 28 wherein it is cooled sufficiently to condense substantially all of the condensable vapor from the stream. Cooling is provided by the evaporation of a liquefied inert gas, such as nitrogen, in the shell side of condenser 22. The liquefied volatile component drops to the bottom of condenser 22 and is removed there-from through drain line 30. The gas stream leaving condenser 22 via line 36 is now dry and substantially free of volatile component. This stream or a portion thereof next passes through heater 38 wherein it is heated to a temperature above about 90° C. for example, a temperature in the range of about 90° to 260° C. and preferably in the range of about 120° to 190° C. The heated purge gas stream passes through line 40, valve 43B and line 10B and then enters adsorption unit 12B. As the heated gas stream passes through unit 12B it desorbs the moisture and carbon dioxide that was previously adsorbed by the adsorbent in this unit. The purge gas, now laden with moisture and carbon dioxide, passes out of adsorption unit 12B via line 14B, and then flows through valve 45B and manifold 44, and leaves the system through vent line 46.

The inert gas leaving the shell side of condenser 22 through line 34 passes through valve 35 and enters gas source 2 where it serves as makeup to partially or completely replace the noncondensable gases removed from this unit through line 3. The amount of makeup gas added to the system depends on the amount of condensable gas that is returned to the source through line 49 In some cases it may be desirable to partially or completely replenish the inert gas stream in gas source 2 with inert gas from another source, such as from a nitrogen generator. In this case the supplemental gas can be provided from an independent source through line 51.

The amount of purge gas necessary to effect the satisfactory desorption of adsorption units 12A and 12B may vary during the course of the operation of the system. During periods of low purge gas demand excess purge gas can be returned to gas source 2 via line 49, by opening valve 50. During periods of high purge gas demand, when the purge gas provided through line 36 may be inadequate to completely purge adsorbers 12A and 12B, additional inert gas can be introduced into purge line 36 through line 47 by opening valve 48.

When the amount of moisture and carbon dioxide adsorbed in adsorption unit 12A reaches a predetermined value the roles of adsorption units 12A and 12B are reversed and unit 12B enters the adsorption mode and unit 12A enters the regeneration mode. In this phase of the cycle, the process gas stream passes through adsorption unit 12B and purge gas passes through adsorption unit 12A. During this step of the cycle, valves 8B, 16B, 35, 37, 43A, and 45A are open and all other valves are closed. Except for the reversal of the roles of adsorption units 12A and 12B, the operation of the second phase of the process is the same as the operation of the the first phase of the process.

FIG. 2 illustrates a vaporized volatile component recovery system adapted to recover solvent vapors from a resin coating drying unit. In the process carried out in the system of FIG. 2, the process feed gas entering line 3 is the gaseous effluent from a solvent-borne resin coating drying unit, indicated in FIG. 2 by reference numeral 2A. A gaseous effluent from a resin coating dryer such as unit 2A usually contains a solvent, such as a hydrocarbon or an oxygenated organic compound, and an environmentally compatible inert carrier gas, such as nitrogen or argon. The gaseous effluent is treated in the system of FIG. 2 to recover substantially all of the solvent from the effluent. The recovered solvent leaves the system through line 30. Part or all of the solvent-free carrier gas may be used to purge adsorption units 12A and 12B and then vented to the atmosphere through vent line 46 and the remainder may be recycled to drying unit 2A, as described in the operation of the process of FIG. 1.

The system illustrated in FIG. 2 is similar to the system of FIG. 1, but has several variations. The system of FIG. 2 contains a gas compressor 60, located in line 20. Compressor 60 serves to increase the pressure of the gas leaving adsorption units 12A and 12B to the desired level. Compressor 60 may be any means capable of compressing a gas to a pressure of up to at least 25 psig (pounds per square inch gauge), such as a gas compressor or a high pressure blower. Compressed process gas leaving compressor 60 enters condenser 22 through inlet header 24 and passes through the rest of the system in the manner explained in the description of the system of FIG. 1.

A second modification provided by the system of FIG. 2 is the use of an intermediate refrigerant circulating system to chill the solvent vapors in condenser 22. The intermediate refrigerant is circulated through intermediate refrigerant chilling unit 62 and the shell side of condenser 22 through lines 64 and 66. This is accomplished by means of an intermediate refrigerant circulating pump (not shown). The intermediate refrigerant is cooled in chilling unit 62 by means of a primary refrigerant, which enters unit 62 through line 32 and leaves this unit via line 34.

The intermediate refrigerant is a cooling agent that has a freezing point lower than water. The intermediate refrigerant is preferably a low boiling liquid or gas, such as a lower molecular weight organic compound, for example a hydrocarbon like methane, ethane, propane, butane, toluene, xylene, etc., or an oxygen-containing organic compound selected from alcohols, ethers, etc. The particular intermediate refrigerant used in the process of the invention illustrated in FIG. 2 is not critical and forms no part of the invention. The intermediate refrigerant circulating through condenser 22 is maintained at a temperature below the boiling point of the volatile component at the pressure that the volatile component is under in condenser 22, and it is preferably maintained at as low a temperature as possible without causing freezing of the volatile component in condenser 22, so that the amount of volatile component recovered in condenser 22 is maximized. To avoid freezing of the volatile component in condenser 22 the intermediate refrigerant is preferably maintained at a temperature above the freezing point of the volatile component.

The primary refrigerant used to chill the intermediate refrigerant may be a chilled or liquefied inert gas and is preferably liquefied nitrogen. When a liquefied inert gas is used as the primary refrigerant it is vaporized in chilling unit 62 and discharged as gas from unit 62 via line 34. The inert gas leaving condenser 62 flows through the rest of the system in the manner explained in the description of the system of FIG. 1.

The third system modification illustrated in FIG. 2 is drying oven 2A. Drying oven 2A comprises a drying chamber 52 and inlet and outlet curtains 53 and 54. The inlet and outlet curtains serve as a gas barrier to minimize the amount of air entering the drying chamber. As mentioned above, it is important to prevent the development of an explosive gas mixture in drying chamber 52. This is accomplished by means of curtains 53 and 54. In the system of FIG. 2, inert gas leaving intermediate refrigerant chilling unit 62 passes through line 34 and valve 35. The inert gas is then split into two streams. A portion of the inert gas stream enters the curtain areas 53 and 54 via lines 68A and 68B, respectively. These gas streams tend to prevent significant volumes of air from entering drying chamber 2A. The remainder of the inert gas stream from line 34 flows through valve 35 and enters drying chamber 52 via line 70. This stream serves as a carrier gas for the solvent being vaporized in drying oven 2A. If the volume of gas leaving unit 62 exceeds the amount of gas used for purging, blanketing and as carrier gas, the excess can be vented to the atmosphere through line 72.

As noted above, the primary refrigerant may be a cooled inert gas or a liquefied inert gas that evaporates in chilling unit 62. In either case the inert gas leaving unit 62 is transported through line 34 to drying oven 2A to serve as a blanketing or carrier gas. As was the case in the process carried out in FIG. 1, when a liquefied inert gas is used, the vaporized primary refrigerant is usually still very cold and it may be desirable to use this stream for cooling of the process gas stream prior to transfer to drying unit 2A.

It will be appreciated that it is within the scope of the invention to utilize conventional equipment to monitor and automatically regulate the cycles of the process and the flow of gases within the systems of the invention so that they can be fully automated to run continuously in an efficient manner.

It can be appreciated that it is only necessary to remove carbon dioxide from the system when the volatile components are recovered from the system at a temperature below the solidification point of carbon dioxide. For example, when the volatile component has a freezing point above the freezing point of carbon dioxide it is not necessary to remove carbon dioxide from the system.

The process of the invention provides a number of advantages over prior art processes. For example, as noted above, the use of the environmentally acceptable, substantially dry and volatile component-free gaseous effluent from condenser to purge adsorption units 12A and 12B permits the system to be operated without the necessity of drying and heating an external gas stream, thereby rendering the system of the invention more economical to operate. Secondly, since the gas stream leaving condenser 22 contains oxygen as an impurity, using this stream as a purge for adsorption units 12A and 12B and replacing the gas leaving the system with a substantially equal amount of fresh inert makeup gas facilitates control of the oxygen content in the system.

The process of the invention can be used to easily recover volatile components from volatile component-saturated streams which are saturated or supersaturated with moisture, and which contain significant amounts of carbon dioxide and oxygen.

Although the invention has been described with particular reference to preferred embodiments, it is understood that variations of these embodiments are contemplated. For example, condenser 22 may be replaced by a battery of two or more condensers arranged in series and/or in parallel. Additionally, the system of the invention can be combined with other equipment, such as volatile component freezing units. The scope of the invention is limited only by the breadth of the appended claims.

I claim:

1. A process for the recovery of a first gaseous component from a gas stream containing said first gaseous component, at least one inert gaseous component having a boiling point below the boiling point of said first gaseous component and at least one gaseous impurity having a freezing point above the freezing point of said first gaseous component, comprising the steps of:
    (a) flowing said gas stream through a first adsorption zone containing an adsorbent which preferentially adsorbs said at least one gaseous impurity thereby depleting the gas stream of said at least one gaseous impurity;
    (b) flowing the at least one gaseous impurity-depleted gas stream exiting said first adsorption zone through a heat transfer zone maintained at a temperature below the boiling point of said first gaseous component, thereby condensing first gaseous component from the gas stream and producing a gaseous effluent that is substantially depleted of said at least one gaseous impurity and said first gaseous component;
    (c) heating at least part of said gaseous effluent to a temperature above about 90° C.;
    (d) flowing the heated gaseous effluent through a second adsorption zone containing an adsorbent which preferentially adsorbs said at least one gaseous impurity and that contains as adsorbate said at least one gaseous impurity, thereby purging said at least one gaseous impurity from said second adsorption zone;
    (e) reversing the role of said first and second adsorption zones when the buildup of at said least one gaseous impurity in said first adsorption zone reaches a predetermined level, so that said at least one gaseous impurity undergoes adsorption in said second adsorption zone and desorption in said first adsorption zone; and
    (f) cyclically repeating steps (a) to (e), thereby continually recovering said first gaseous component from said gas stream.

2. The process of claim 1, wherein said at least one gaseous impurity comprises water vapor, carbon dioxide or mixtures of these.

3. The process of claim 1 or claim 2, wherein said first gaseous component is an organic compound.

4. The process of claim 3, wherein said organic compound is selected from hydrocarbons, oxygen-substituted hydrocarbons, chlorinated hydrocarbons and mixtures of these.

5. The process of claim 3 wherein said gas stream contains oxygen as an impurity.

6. The process of claim 5 wherein said inert gaseous component is nitrogen, argon or mixtures of these.

7. The process of claim 1 or claim 2, wherein said gaseous impurity-depleted gas stream is compressed to a pressure of at least about 2 psig prior to flowing it through said heat transfer zone.

8. The process of claim 7, wherein the gas stream is compressed to a pressure of about 2 to about 25 psig.

9. The process of claim 1 or claim 2, wherein part of the gaseous effluent exiting said heat transfer zone is recycled to said source.

10. The process of claim 9 wherein said source is an inert gas blanketed reaction vessel or a solvent-borne resin coating drying oven.

11. A process for the recovery of a vaporized volatile component from a gas stream containing said vaporized volatile component, at least one inert gaseous component having a boiling point below the boiling point of said volatile component, at least one first gaseous impurity selected from water vapor, carbon dioxide and mixtures of these, and at least one noncondensable gaseous impurity that is chemically reactive with said first gaseous component, comprising the steps of:

(a) flowing said gas stream through a first adsorption zone containing an adsorbent which preferentially adsorbs said at least one first gaseous impurity, thereby depleting the gas stream of said at least one first gaseous impurity;

(b) flowing the first gaseous impurity-depleted gas stream exiting said first adsorption zone through a heat transfer zone maintained at a temperature in the range between the freezing point and the boiling point of said volatile component, thereby condensing volatile component from the gas stream and producing a gaseous effluent that is substantially depleted of said at least one first gaseous impurity and said volatile component;

(c) heating at least part of said gaseous effluent to a temperature above about 90° C.;

(d) flowing said heated gaseous effluent through a second adsorption zone containing an adsorbent which preferentially adsorbs said at least one first gaseous impurity and that contains as adsorbate said at least one first gaseous impurity, thereby purging said at least one first gaseous impurity from said second adsorption zone;

(e) reversing the role of said first and second adsorption zones when the buildup of said at least one first gaseous impurity in said first adsorption zone reaches a predetermined level, so that said at least one first gaseous impurity undergoes adsorption in said second adsorption zone and desorption in said first adsorption zone; and (f) cyclically repeating steps (a) to (e), thereby continually recovering said volatile component from said gas stream.

12. The process of claim 11, wherein said volatile component is an organic compound.

13. The process of claim 12, wherein said organic compound is selected from hydrocarbons, oxygen-substituted hydrocarbons, chlorinated hydrocarbons and mixtures of these.

14. The process of claim 11 wherein said noncondensable gaseous impurity is oxygen.

15. The process of claim 14 wherein said inert gaseous component is nitrogen, argon or mixtures of these.

16. The process of claim 11, wherein said first gaseous impurity-depleted gas stream is compressed to a pressure of at least about 2 psig prior to flowing it through said heat transfer zone.

17. The process of claim 16, wherein the gas stream is compressed to a pressure of about 2 to about 25 psig.

18. The process of claim 1 or claim 11, wherein said heat transfer zone is cooled by indirect heat transfer with a refrigerant.

19. The process of claim 18, wherein said refrigerant is selected from chilled inert gas, liquefied inert gas and mixtures of these.

20. The process of claim 19, wherein said inert gas is selected from nitrogen, argon and mixtures of these.

21. The process of claim 18, wherein the gas stream entering said heat transfer zone is compressed to about 5 to about 15 psig.

22. The process of claim 18, wherein said refrigerant cools an intermediate refrigerant which provides cooling in said heat transfer zone.

23. The process of claim 18, wherein said refrigerant is selected from hydrocarbons, alcohols and mixtures of these.

24. A process for the recovery of one or more vaporized volatile components from a gas stream containing said at least one vaporized volatile component, nitrogen, water vapor and oxygen, comprising the steps of:

(a) withdrawing said gas stream from a source;

(b) flowing said gas stream through a first adsorption zone containing an adsorbent which preferentially adsorbs water vapor, thereby depleting the gas stream of water vapor;

(b) flowing the water vapor-depleted gas stream exiting said first adsorption zone through a heat transfer zone maintained at a temperature in the range between the freezing point and the boiling point of said one or more volatile components, thereby condensing said one or more volatile components from the gas stream and producing a gaseous effluent that is substantially depleted of water vapor and said at least one volatile component;

(c) heating at least part of said gaseous effluent to a temperature in the range of about 90° C. to about 260° C.;

(d) flowing said heated gaseous effluent through a second adsorption zone containing an adsorbent which preferentially adsorbs water vapor and contains adsorbed water vapor, thereby purging said adsorbed water vapor from said second adsorption zone;

(e) introducing substantially pure nitrogen into said source (f) reversing the role of said first and second adsorption zones when the buildup of water vapor in said first adsorption zone reaches a predetermined levels so that water vapor undergoes adsorption in said second adsorption zone and desorption in said first adsorption zone; and (g) cyclically repeating steps (a) to (f), thereby continually recovering said volatile component from said gas stream.

25. The process of claim 24, wherein said at least one volatile component is an organic compound.

26. The process of claim 25, wherein said organic compound is selected from hydrocarbons, oxygen-substituted hydrocarbons, chlorinated hydrocarbons and mixtures of these.

27. The process of claim 24, additionally comprising the step of compressing the water vapor-depleted gas stream exiting said first adsorption zone to a pressure of about 2 to about 25 psig prior to flowing it into said heat transfer zone.

28. The process of claim 24, wherein part of the gaseous effluent exiting said heat transfer zone is recycled to said source.

29. The process of claim 28 wherein said source is an inert gas blanketed reaction vessel or a solvent-borne resin coating drying oven.

30. The process of claim 24, wherein said heat transfer zone is chilled with a cooled or liquefied inert gaseous substance and said inert gaseous substance is subsequently transported to said source.

31. The process of claim 24, wherein the amount of substantially pure nitrogen introduced into said source is sufficient to substantially replace the volume of noncondensable gases removed from the system during step (d).

* * * * *